(12) United States Patent
Adsumilli et al.

(10) Patent No.: US 10,824,911 B2
(45) Date of Patent: *Nov. 3, 2020

(54) COMBINING INDEPENDENT SOLUTIONS TO AN IMAGE OR VIDEO PROCESSING TASK

(71) Applicant: GoPro, Inc., San Mateo, CA (US)

(72) Inventors: Balineedu Chowdary Adsumilli, San Francisco, CA (US); Ryan Lustig, Encinitas, CA (US)

(73) Assignee: GoPro, Inc., San Mateo, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 15/973,184

(22) Filed: May 7, 2018

(65) Prior Publication Data
US 2018/0322369 A1   Nov. 8, 2018

Related U.S. Application Data

(62) Division of application No. 15/177,310, filed on Jun. 8, 2016, now Pat. No. 9,965,703.

(51) Int. Cl.
*G06K 9/62* (2006.01)
*G06K 9/00* (2006.01)
(Continued)

(52) U.S. Cl.
CPC ....... *G06K 9/6262* (2013.01); *G06K 9/00744* (2013.01); *G06K 9/6227* (2013.01);
(Continued)

(58) Field of Classification Search
None
See application file for complete search history.

(56) References Cited

U.S. PATENT DOCUMENTS 5,048,095 A   9/1991 Bhanu
5,214,744 A   5/1993 Schweizer
(Continued)

FOREIGN PATENT DOCUMENTS

WO   WO-2013019743 A2 *   2/2013   ........... G06K 9/6234

OTHER PUBLICATIONS

Wang et al., "A fast self-tuning background subtraction algorithm." In Proceedings of the IEEE Conference on Computer Vision and Pattern Recognition Workshops, pp. 395-398. 2014. (Year: 2014).*
(Continued)

*Primary Examiner* — Feng Niu
(74) *Attorney, Agent, or Firm* — Gazdzinski & Associates, PC (57) ABSTRACT

An algorithm for performing an image or video processing task is generated that may be used to combine a plurality of different independent solutions to the image or video processing task in an optimized manner. A plurality of base algorithms may be applied to a training set of images or video and a first generation of different combining algorithms may be applied to combine the respective solutions from each of the respective base algorithms into respective combined solutions. The respective combined solutions may be evaluated to generate respective fitness scores representing measures of how well the plurality of different combining algorithms each perform the image or video processing task. The algorithms may be iteratively updated to generate an optimized combining algorithm that may be applied to an input image or video.

17 Claims, 8 Drawing Sheets

(51) Int. Cl.
*G06N 20/00* (2019.01)
*G06N 3/12* (2006.01)
*G06N 7/00* (2006.01)

(52) U.S. Cl.
CPC ......... *G06K 9/6229* (2013.01); *G06K 9/6256* (2013.01); *G06N 3/126* (2013.01); *G06N 20/00* (2019.01); *G06K 9/00228* (2013.01); *G06N 7/005* (2013.01)

(56) References Cited

U.S. PATENT DOCUMENTS

| | | | |
|---|---|---|---|
| 5,841,947 A | 11/1998 | Nordin | |
| 6,937,760 B2 | 8/2005 | Schoepflin | |
| 7,481,453 B2 | 1/2009 | Breed | |
| 8,774,504 B1 | 7/2014 | Sundareswara | |
| 8,838,510 B2* | 9/2014 | Baughman | G06N 3/126 706/13 |
| 9,224,070 B1 | 12/2015 | Sundareswara | |
| 9,297,918 B2 | 3/2016 | Lim | |
| 9,576,201 B2* | 2/2017 | Wu | G06K 9/628 |
| 9,792,553 B2* | 10/2017 | Kapur | G06N 20/00 |
| 10,192,117 B2* | 1/2019 | Loui | G06K 9/6224 |
| 10,439,891 B2* | 10/2019 | Baughman | H04L 41/145 |
| 10,463,257 B2* | 11/2019 | Schwartz | G06T 7/44 |
| 2002/0085754 A1 | 7/2002 | Schoepflin | |
| 2007/0228703 A1 | 10/2007 | Breed | |
| 2007/0288410 A1 | 12/2007 | Tomkins | |
| 2009/0125370 A1* | 5/2009 | Blondeau | G06F 9/5066 705/7.27 |
| 2012/0239517 A1* | 9/2012 | Blondeau | G06N 3/126 705/26.1 |
| 2014/0188769 A1 | 7/2014 | Lim | |
| 2014/0270488 A1* | 9/2014 | Suleyman | G06K 9/00362 382/157 |
| 2015/0248590 A1* | 9/2015 | Li | G06T 7/194 382/103 |
| 2016/0029031 A1 | 1/2016 | Fahn | |
| 2016/0133023 A1* | 5/2016 | Kaestle | G06K 9/00369 382/218 |
| 2016/0259980 A1* | 9/2016 | Mlybari | G06T 7/277 |
| 2017/0257651 A1 | 9/2017 | Zhu | |
| 2017/0270385 A1* | 9/2017 | Kaestle | G06K 9/6215 |

OTHER PUBLICATIONS

Wikipedia, Genetic algorithm, May 11, 2016 (14 pages).
Hornby, G., et al. 'Automated antenna design with evolutionary algorithms.' AIAA Space, 2006, pp. 1-8.
St-Charles, P.-L., et al., "Subsense: A universal change detection method with local adaptive sensitivity." IEEE Transactions on Image Processing, 2015, pp. 359-373, vol. 24, Issue 1.
Zivkovic, Z., 'Improved adaptive gaussian mixture model for background subtraction,' Proceedings of the 17th International Conference on Pattern Recognition (ICPR'04), Pattern Recognition, IEEE 2004, pp. 28-31. vol. 2.
Zivkovic, Z., et al, 'Effcient adaptive density estimation per image pixel for the task of background subtraction,' Pattern recognition letters, 2006, pp. 773-780, vol. 27, Issue 7.

* cited by examiner

COMBINING INDEPENDENT SOLUTIONS TO AN IMAGE OR VIDEO PROCESSING TASK

PRIORITY

This application is a divisional of, and claims the benefit of priority to, co-owned and co-pending U.S. patent application Ser. No. 15/177,310 filed Jun. 8, 2016 of the same title, the foregoing being incorporated herein by reference in its entirety.

BACKGROUND

Technical Field

This disclosure relates to video or image processing, and more specifically, to combining solutions to an image or video processing task.

Description of the Related Art

A variety of different algorithms often exist to perform the same image or video processing task. For example, Gaussian Mixture Models (GMMs), K-Nearest Neighbors (K-NN), and Self-Balanced Sensitivity Segmenter (SuBSENSE) are each different algorithms that may be used for performing background subtraction on an image. In another example, motion-based algorithms, audio-based algorithms, scene change-based algorithms, or face detection algorithms may each be used for the common task of automatically detecting video highlights in an input video. In these and other examples, different algorithms may produce better results in different situations, which may depend on, for example, object motion, lighting, or other factors.

SUMMARY

The present disclosure satisfies the foregoing needs by providing, inter alia, methods and apparatus for aligning a target image to a reference image in the presence of lens distortion.

In one aspect, a method for generating an algorithm for performing an image or video processing task is disclosed. In one embodiment, the method includes receiving a training set of input images or videos; applying a plurality of base algorithms to the training set, each of the base algorithms independently generating respective base algorithm results as respective solutions to the image or video processing task; applying a first generation of different combining algorithms, where the applying of the first generation of different combining algorithms includes combining the respective solutions from each of the respective base algorithms into respective combined solutions, where the applying of the first generation of different combining algorithms further includes: applying a first subset of a predefined plurality of operations to at least a subset of the respective base algorithms to generate first tier results; and applying a second subset of the predefined plurality of operations to the first tier results of the respective base algorithms results to generate second tier results; evaluating the respective combined solutions from the first generation of different combining algorithms to generate respective fitness scores representing measures of how well the plurality of different combining algorithms each perform the image or video processing task; updating the first generation of different combining algorithms based on the respective fitness scores to generate a second generation of different combining algorithms; and selecting, by a processor, an optimized combining algorithm from the second generation of different combining algorithms that best meets a predefined optimization criterion associated with the image or video processing task; wherein the image or video processing task includes a background segmentation task, wherein each of the plurality of base algorithms includes different background segmentation algorithms, and wherein each of the respective base algorithm results includes respective binary masks generated from a different one of the different background segmentation algorithms.

In one variant, the updating of the first generation of different combining algorithms includes: selecting a parent algorithm from the first generation of different combining algorithms based on the respective fitness scores; and duplicating the parent algorithm to generate an elite child algorithm from the parent algorithm as one of the second generation of different combining algorithms.

In another variant, the updating of the first generation of different combining algorithms includes: selecting a parent algorithm from the first generation of different combining algorithms based on the respective fitness scores; and changing one or more operators, inputs, or structures of the parent algorithm to generate a mutation child algorithm as one of the second generation of different combining algorithms.

In yet another variant, the changing of the one or more operators, inputs, or structures of the parent algorithm includes randomly changing the one or more operators, inputs, or structures of the parent algorithm.

In yet another variant, the updating of the first generation of different combining algorithms includes: selecting a first parent algorithm from the first generation of different combining algorithms based on the respective fitness scores; and selecting a second parent algorithm from the first generation of different combining algorithms based on the respective fitness scores; and combining a first portion of the first parent algorithm with a second portion of the second parent algorithm to generate a crossover child algorithm as one of the second generation of different combining algorithms.

In yet another variant, the plurality of base algorithms includes at least one of: a Gaussian Mixture Models (GMMs) algorithm, a K-Nearest Neighbors (K-NN) algorithm, and a Self-Balanced Sensitivity Segmenter (SuBSENSE) algorithm.

In yet another variant, the predefined plurality of operations includes at least one of: a 5×5 median filter, a morphological image dilation with a 5×5 square kernel, a morphological image erosion with a 5×5 square kernel, a logical AND operation between two inputs, a logical OR operation between two images, and a majority vote with two or more inputs.

In yet another variant, the image or video processing task includes an automatic highlight detection task, wherein each of the plurality of base algorithms including different automatic highlight detection algorithms, and wherein each of the respective base algorithm results includes a set of parameters indicating a time in a video at which a highlight occurred and a duration of the highlight.

In yet another variant, the plurality of base algorithms includes at least one of: a motion detection algorithm, a scene change detection algorithm, a face detection algorithm, and an audio highlight detection algorithm.

In yet another variant, the predefined plurality of operations includes at least one of: a majority vote for highlights occurring within a same time duration, a logical AND operation of the duration of the highlight, and a logical OR operation of the duration of the highlight ("OR").

In yet another variant, the method further includes determining whether a stopping criterion is met by the generated second generation of different combining algorithms; when the stopping criterion is met, selecting the optimized combining algorithm from the second generation of different combining algorithms; and otherwise when the stopping criterion is not met, evaluating the second generation of different combining algorithms to generate respective fitness scores.

In a second aspect, a non-transitory computer-readable storage apparatus is disclosed. In one embodiment, the non-transitory computer-readable storage apparatus includes a storage medium for storing instructions for generating an algorithm for performing an image or video processing task, the instructions, when executed by a processor apparatus, being configured to cause the processor apparatus to perform steps including: receiving a training set of input images or videos; applying a plurality of base algorithms to the training set, each of the base algorithms independently generating respective base algorithm results as respective solutions to the image or video processing task; applying a first generation of different combining algorithms, each of the first generation of different combining algorithms being configured to combine the respective solutions from each of the respective base algorithm results into respective combined solutions; evaluating the respective combined solutions from the first generation of different combining algorithms to generate respective fitness scores representing measures of how well the plurality of different combining algorithms each perform the image or video processing task; updating the first generation of different combining algorithms based on the respective fitness scores to generate a second generation of different combining algorithms; and selecting an optimized combining algorithm from the second generation of different combining algorithms that best meets a predefined optimization criterion associated with the image or video processing task; wherein the applying of the first generation of different combining algorithms includes: applying a first subset of a predefined plurality of operations to at least a subset of the respective base algorithm results to generate first tier results; and applying a second subset of the predefined plurality of operations to the first tier results or the respective base algorithm results to generate second tier results; and wherein the image or video processing task includes a background segmentation task, wherein each of the plurality of base algorithms includes different background segmentation algorithms, and wherein each of the respective base algorithm results includes respective binary masks generated from a different one of the different background segmentation algorithms.

In one variant, the updating of the first generation of different combining algorithms includes: selecting a parent algorithm from the first generation of different combining algorithms based on the respective fitness scores; and duplicating the parent algorithm to generate an elite child algorithm from the parent algorithm as one of the second generation of different combining algorithms.

In another variant, the updating of the first generation of different combining algorithms includes: selecting a parent algorithm from the first generation of different combining algorithms based on the respective fitness scores; and changing one or more operators, inputs, or structures of the parent algorithm to generate a mutation child algorithm as one of the second generation of different combining algorithms.

In yet another variant, the changing of the one or more operators, inputs, or structures of the parent algorithm includes a randomly change thereof.

In yet another variant, the updating of the first generation of different combining algorithms includes: selecting a first parent algorithm from the first generation of different combining algorithms based on the respective fitness scores; and selecting a second parent algorithm from the first generation of different combining algorithms based on the respective fitness scores; and combining a first portion of the first parent algorithm with a second portion of the second parent algorithm to generate a crossover child algorithm as one of the second generation of different combining algorithms.

In yet another variant, the plurality of base algorithms includes at least one of: a Gaussian Mixture Models (GMMs) algorithm, a K-Nearest Neighbors (K-NN) algorithm, and a Self-Balanced Sensitivity Segmenter (SuB SENSE) algorithm.

In yet another variant, the predefined plurality of operations includes at least one of: a 5×5 median filter, a morphological image dilation with a 5×5 square kernel, a morphological image erosion with a 5×5 square kernel, a logical AND operation between two inputs, a logical OR operation between two images, and a majority vote with two or more inputs.

In yet another variant, the image or video processing task includes an automatic highlight detection task, wherein each of the plurality of base algorithms includes different automatic highlight detection algorithms, and wherein each of the respective base algorithm results includes a set of parameters indicating a time in a video at which a highlight occurred and a duration of the highlight.

In yet another variant, the plurality of base algorithms includes at least one of: a motion detection algorithm, a scene change detection algorithm, a face detection algorithm, and an audio highlight detection algorithm.

In yet another variant, the predefined plurality of operations includes at least one of: a majority vote for highlights occurring within a same time duration, a logical AND operation of the duration of the highlight, and a logical OR operation of the duration of the highlight ("OR").

In yet another variant, the instructions, when executed by the processor apparatus, are further configured to cause the processor apparatus to perform steps including: determining whether a stopping criterion is met by the generated second generation of different combining algorithms; when the stopping criterion is met, selecting the optimized combining algorithm from the second generation of different combining algorithms; and otherwise when the stopping criterion is not met, evaluating the second generation of different combining algorithms to generate respective fitness scores.

In another aspect, a method for combining solutions for an image or video processing task is disclosed. In one embodiment thereof, the image or video processing task includes an automatic highlight detection task, and the method includes: independently applying a first algorithm and a second algorithm to at least a first portion of a set of input images or video; independently generating respective first and second algorithm results associated with the image or video processing task; combining the first algorithm result with the second algorithm result into a first combined solution; evaluating a plurality of combined solutions, the plurality of combined solutions comprising the first combined solution and at least a second combined solution, the evaluating comprising determining a best combined solution; and performing at least the automatic highlight detection task for the set of input images or video based at least on the determined best combined solution.

In another aspect, a computer system is disclosed. In one embodiment thereof, the computer system includes: a network interface configured to at least receive data comprising imaging content; and a non-transitory computer-readable storage apparatus including a storage medium having instructions stored thereon, the instructions configured for combining independent solutions for an image or video processing task including an automatic highlight detection task, the instructions further configured to, when executed by a processor apparatus, cause the computer system to: apply a plurality of algorithms to the imaging content, the plurality of algorithms comprising a plurality of automatic highlight detection algorithms, each of the plurality of algorithms independently generating respective algorithm results to the automatic highlight detection task, the respective algorithm results comprising a first algorithm result and a second algorithm result; combine the first algorithm result with the second algorithm result into a first combined solution; evaluate respective combined solutions, the respective combined solutions comprising the first combined solution, in order to determine a best combined solution for the respective combined solutions; and use the best combined solution to perform at least the automatic highlight detection task for the imaging content.

Other features and advantages of the present disclosure will be immediately recognized by persons of ordinary skill in the art with reference to the attached drawings and detailed description of exemplary embodiments as given below.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure (or "FIG.") 1 illustrates an example embodiment of a media processing system.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

In an embodiment, a method may generate an algorithm for performing an image or video processing task. A training set of input images or videos may be received. A plurality of base algorithms may be applied to the training set. Each of the base algorithms may independently generate respective base algorithm results as respective solutions to the image or video processing task. A first generation of different combining algorithms may be applied. Each of the first generation of different combining algorithms may combine the respective solutions from each of the respective base algorithms into respective combined solutions. The respective combined solutions from the first generation of different combining algorithms may be evaluated to generate respective fitness scores representing measures of how well the plurality of different combining algorithms each perform the image or video processing task. The first generation of different combining algorithms may be updated based on the respective fitness scores to generate a second generation of different combining algorithms. An optimized combining algorithm may be selected from the second generation of different combining algorithms that may best meet a predefined optimization criterion associated with the image or video processing task.

In another embodiment, a non-transitory computer-readable storage medium may store instructions that when executed by a processor cause the processor to generate an algorithm for performing an image or video processing task according to the process described above.

In another embodiment, a computing device may comprise a processor and a non-transitory computer-readable storage medium that may store instructions that when executed by the processor, cause the processor to generate an algorithm for performing an image or video processing task according to the process described above.

Media Processing System

Figure 1:
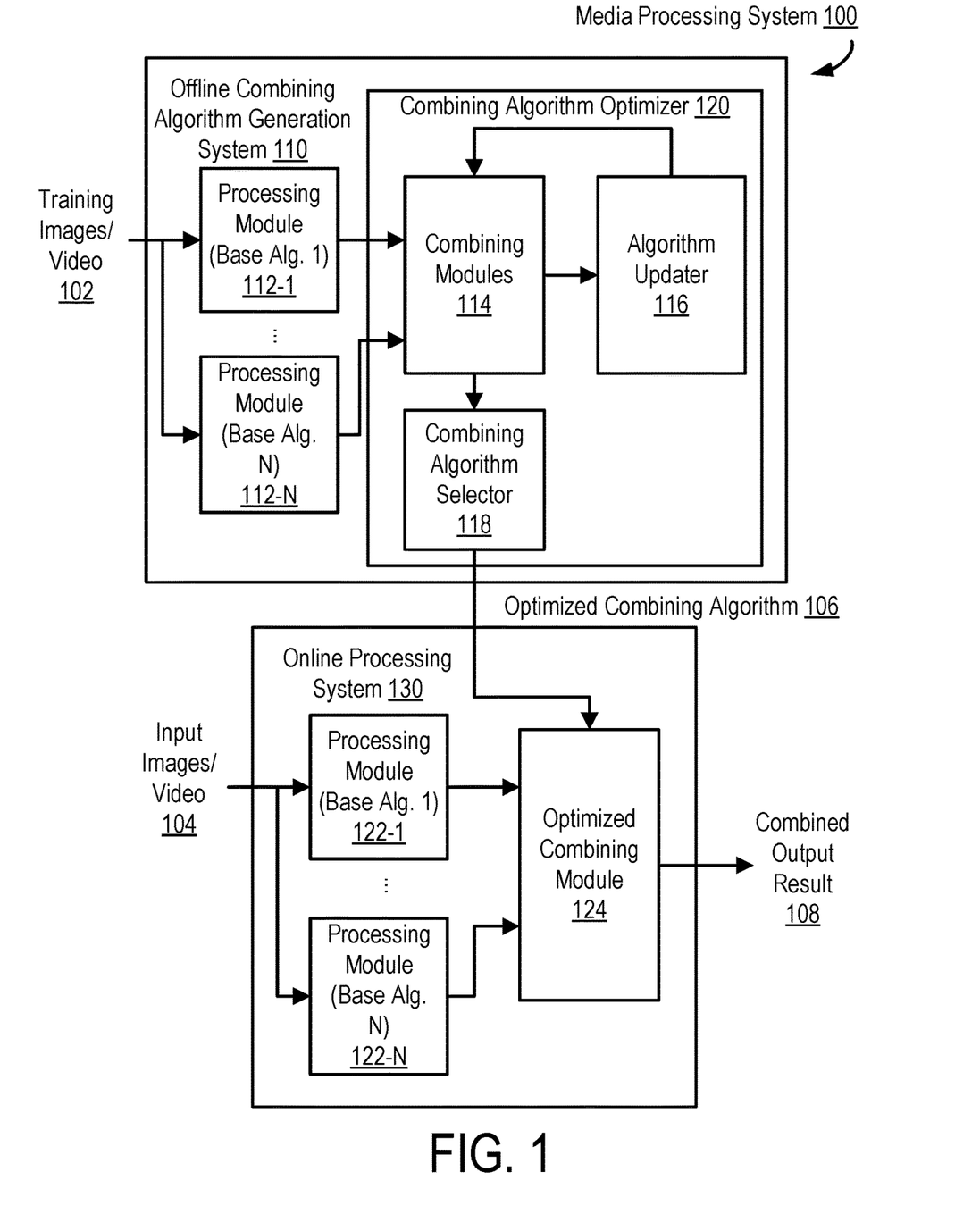

FIG. 1 is a block diagram of a media processing system 100. The media processing system may comprise an offline combining algorithm generation system 110 and an online processing system 120. The offline combining algorithm generation system 110 may generally operates in an offline manner to generate an optimizing combining algorithm 106 from a set of training images or videos 102. Once the optimized combining algorithm 106 is generated, the online processing system 130 may operate in an online manner to apply the optimizing combining algorithm 106 to input images or video 104 to generate a combined output result 108.

In an embodiment, the offing combining algorithm generation system 110 may receive a plurality of training images or videos 102 and apply a plurality of different base algorithms (e.g., base algorithms 1, N) by respective processing modules 112 (e.g., processing modules 112-1, ..., 112-N). Each of the processing modules 112 generates a respective base algorithm result, which provides an independent solution to an image or video processing task. For example, the processing modules 112 may each apply a different base algorithm to generate an independent solution to a background segmentation task. In another embodiment, the processing modules 112 may each apply a different base algorithm to generate an independent solution to an automatic highlight detection task. In yet other embodiments, the processing modules 112 may each apply a different base algorithm to generate an independent solution to tasks such as, for example, an object tracking task, an image registration or alignment task, an image classification task, an image stitching task, or other image or video processing task for which multiple independent algorithms exist for generating solutions. A combining algorithm optimizer 120 determines an optimized combining algorithm 106 for combining the respective base algorithm results into a combined result. The combining algorithm optimizer 120 may determine the optimized combining algorithm 106 based on a predefined optimization criterion and a set of predefined constraints limiting how the base algorithms results may be combined. For example, the constraints may dictate a predefined set of operators that can be applied at each step of the combining algorithm, a predefined maximum number of operations in the combining algorithm, or other parameters that limit the characteristics of the combining algorithm. The optimization criterion may comprise a metric indicating how well the combining algorithm operates to achieve the desired image or video processing task for the set of training images or video 102.

Once the optimized combining algorithm 106 is determined, it may be used by the online processing system 120. In the online processing system 120, a plurality of processing modules 122 (e.g., processing module 122-1, ..., 122-N) each apply respective base algorithms (e.g., base algorithms 1, N, which may be the same as the base algorithms applied by the processing modules 112) to an input image or video 104 to generate respective base algorithm results. An optimized combining module 124 may then apply the optimized combining algorithm 106 to combine the respective base algorithm results into a combined output result 108. The combined output result 108 may represent a solution to the image or video processing task solved by the base algorithms which achieves better performance than any of the individual base algorithms.

As a representative example, the media processing system 100 may be configured to perform a background segmentation task. Here, the offline combining algorithm generation system 110 may comprises a first processing module 112-1 that performs a GMM algorithm for background segmentation, a second processing module 112-2 that performs a K-NN algorithm for background segmentation, and a third processing module 112-3 that performs a SuB SENSE algorithm for background segmentation. The online processing system 130 may similarly include a first processing module 122-1 that performs a GMM algorithm for background segmentation, a second processing module 122-2 that performs a K-NN algorithm for background segmentation, and a third processing module 122-3 that performs a SuB SENSE algorithm for background segmentation. Each of these base algorithms may generate respective binary masks as baseline algorithm output results that represent the segmented foreground and background. The respective binary masks generated from each algorithm 112 may be slightly different because the algorithms operate independently of each other and are based on different principles to achieve the segmentation task. Furthermore, different algorithms may have higher performance under different conditions such as, for example, lighting conditions, object motion conditions, or other conditions that may affect the visual appearance of the training images or videos 102. In the offline combining algorithm generation system 110, the combining algorithm optimizer 120 may determine an algorithm for combining the binary masks generated by each of the base algorithms into a combined binary mask that achieves a better representation of the segmented foreground and background (e.g., according to some optimization metric) than any of the individual base algorithms over a wide variety of conditions. For example, the optimized combining algorithm may comprise a set of operations (e.g., summing operations, difference operations, filtering operations, binary operations, etc.) performed on the binary masks outputted from the base algorithms. The online processing system 120 may then apply the optimized combining algorithm 106 to a set of binary masks generated from the different background segmentations algorithms when applied to an input image or video 104 to generate a combined binary mask as the combined output result 108.

In another example embodiment, the media processing system 100 may be applied to a different image or video processing task. For example, in one embodiment, each of the processing modules 112 and processing modules 122 may perform a different automatic highlight detection algorithm that each output a set of parameters indicating where a highlight is found in a video. For example, different ones of the processing modules 112, 122 may apply a face detection algorithm, an audio highlight detection algorithm, a motion detection algorithm, and a scene change detection algorithm that each independently determines a range of video frames where a highlight is detected. The combining algorithm optimizer 120 may determine an optimized combining algorithm 106 for combining these highlight detection parameters to achieve a combined result that achieves better performance at accurately detecting highlights (e.g., according to some optimization criterion) over a variety of conditions present in the training images and video 102. The online processing system 130 may then apply the optimized combining algorithm 106 to generate a combined output result 108 for an input image or video. In yet other embodiments, the media processing system 100 may be applied to performing an object tracking task, an image registration or alignment task, an image classification task, a stitching task, or other image or video processing task.

The combining algorithm optimizer 120 may comprise a plurality of combining modules 114, an algorithm updater 116, and a combining algorithm selector 118. The combining modules 114 may each apply a different combining algorithm that combines the results from the base algorithms in a different way. The results of each of these different combining algorithms may be analyzed and updated by the algorithm updater 116 in a manner that generally increases the performance of the combining algorithms over time (e.g., with respect to a performance metric associated with evaluating the image or video processing task). The process of applying the different combining algorithms in the combining modules 114 and updating the algorithms in the algorithm updater 116 may iterate until a stopping criterion is met (e.g., a threshold number of iterations have been completed or a desired performance metric has been met). Once the stopping criterion is met, the combining algorithm selector 118 may select the best combining algorithm (e.g., highest performing according to a performance metric for the image or video processing task) as the optimized combining algorithm 106. A process for optimizing the combining algorithm as performed by the combining algorithm optimizer 120 is described in further detail below with respect to FIG. 2.

Figure 8:
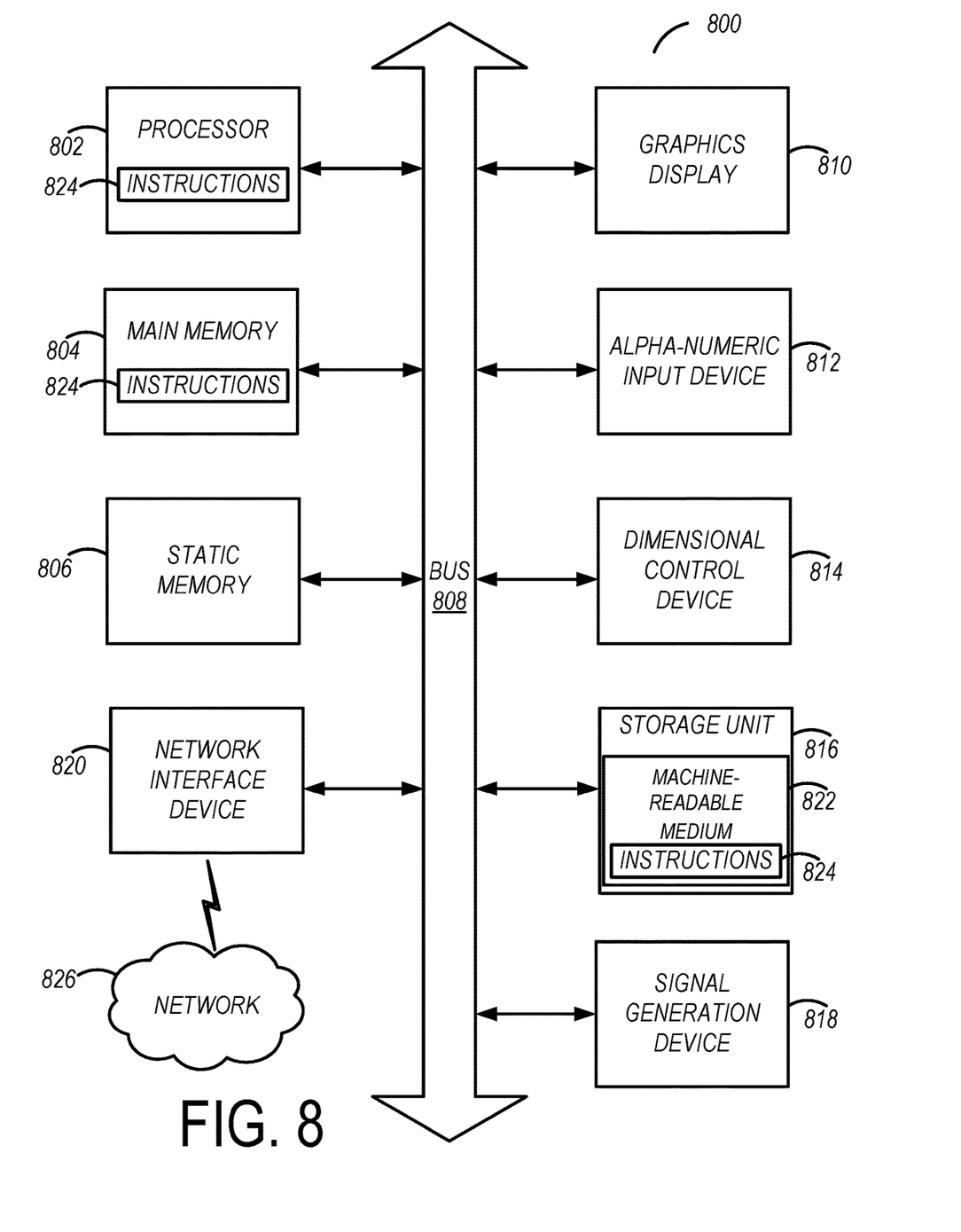
FIG. 8 illustrates an example computer system.

In an embodiment, the offline combining algorithm generation system 110 may be implemented as, for example, one or more processors and a non-transitory computer-readable storage medium storing instructions that when executed by the one or more processors carries out the functions attributed to the offline combining algorithm generation system 110 and the associated processes described below. Similarly, the online processing system 130 may be implemented as, for example, one or more processors and a non-transitory computer-readable storage medium storing instructions that when executed by the one or more processors carries out the functions attributed to the online processing system 110 and the processes described below. In different embodiment embodiments, the offline combining algorithm generation system 110 and online processing system 130 may partly or wholly be implemented within the same physical system such that at least some of functions attributed to each are performed by the same processor or using a common set of instructions. For example, the processing modules 112 and processing modules 122 may be implemented by a common set of instructions that performs the associated baseline algorithm. In other embodiments, the offline combining algorithm generation system 110 and online processing system 130 may be wholly or partly implemented in different physical systems. In different embodiments, all or parts of the media processing system 100 may be implemented in, for example, a video server, a personal computer, a mobile device, a camera, or other processing device. An example of a computer system that may correspond to all or part of the offline combining algorithm generation system 110 and online processing system 130 is illustrated in FIG. 8 described in further detail below.

Figure 2:
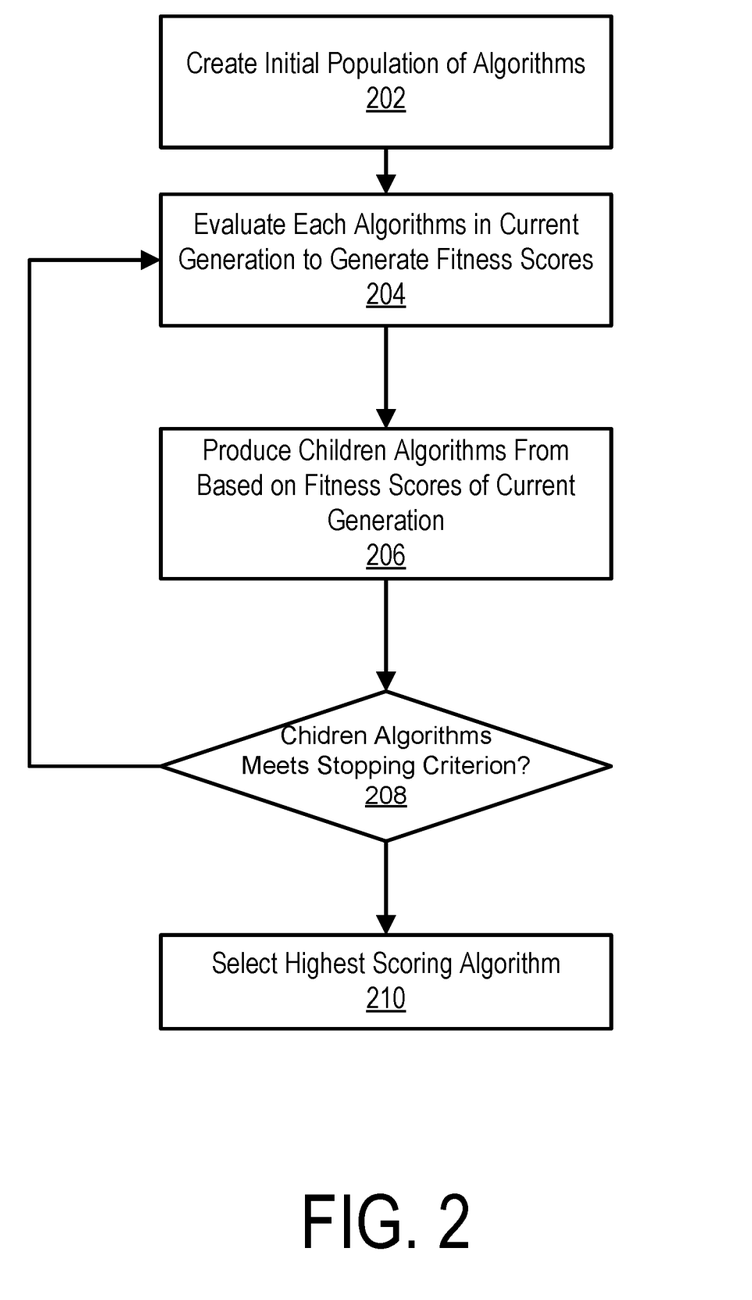
FIG. 2 illustrates an embodiment of a process for generating an algorithm for performing an image or video processing task.
Figure 3:
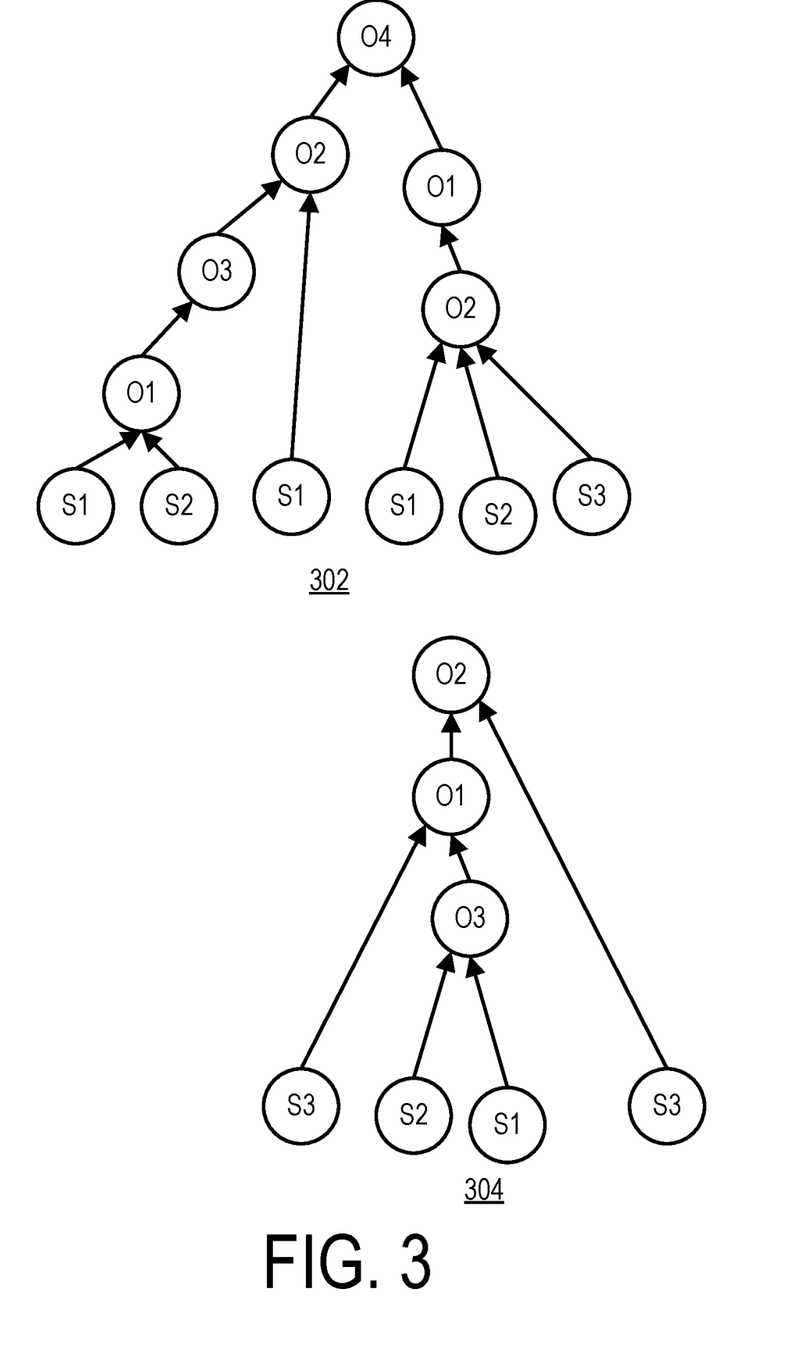
FIG. 3 illustrates a tree structure representing an example combining algorithm for combining results of independent base algorithms for solving an image or video processing task.

FIG. 2 illustrates an embodiment of a process for generating a combining algorithm that may combine solutions from two or more base algorithms for an image or video processing task. An initial population of combining algorithms may be created 202. Each combining algorithms in the initial population may combine a plurality of results from the different base algorithms based on a hierarchical set of operations. Examples of two different generic combining algorithms are illustrated in FIG. 3. Here, a plurality of solutions S1, S2, S3 may represent outputs of the base algorithms for performing a particular image or video processing task. These solutions S1, S2, S3 may be combined according to a plurality of predefined operators O1, O2, O3, O4 arranged in a tree structure in which each input solution represents a "leaf" in the tree and each operator represents a "node." For example, the example algorithm 302 in FIG. 3 may be represented by the following function:

$O_4(O_2(O_3(O_1(S_1,S_2)),S_1),O_1(O_2(S_1,S_2,S_3)))$

Furthermore, the algorithm 304 in FIG. 3 may be represented by the following function:

$O_2((O_1(O_3(S_1,S_2)),S_3),S3)$

Each of these combining algorithms 302, 304 may combine the base solutions S1, S2, S3 in different ways, according to different tree structures in which leafs may be selected from the set of base solutions and nodes may be selected from the set of operators O1, O2, O3, O4. In one embodiment, each of the combining algorithms in the initial population may be randomly generated within a predefined set of parameters that may limit, for example, the set of input solutions, the set of possible operators, or the size or structure of the tree. Although only two algorithms are shown in the example population of FIG. 3, a population may include a significantly number of combining algorithms.

Referring back to FIG. 2, each of the combining algorithms may then be evaluated 204 to generate respective fitness scores. For example, each of the combining algorithms may be performed on the outputs of the base algorithms to generate respective output results, and the output results may be scored based on a quality metric to determine which combining algorithms perform best to achieve the desired task.

Figure 4:
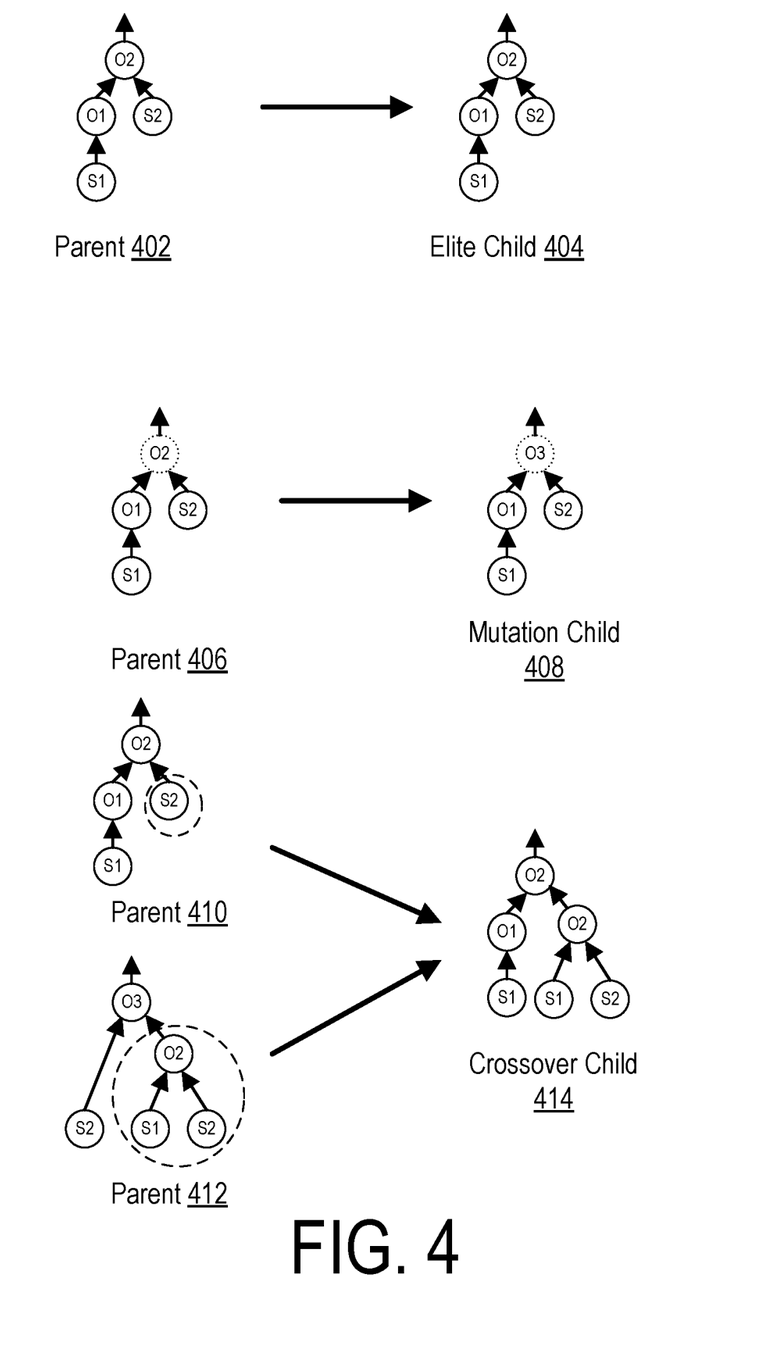
FIG. 4 illustrates a set of tree structures representing example ways of producing a new generation of combining algorithms from a set of parent algorithms.

"Children" algorithms may then be generated based on the initial population of combining algorithms and their respective fitness scores. In one embodiment, the children algorithms can be generated in three different ways: (1) as "elite children"; (2) as "crossover children"; and (3) as "mutation children." FIG. 4 illustrates examples of each of these. In the example of FIG. 4, an elite child 404 may be generated as a direct copy of a parent algorithm 402. A mutation child 408 may be generated by randomly changing one or more aspects of the tree structure of a parent algorithm 406. For example, in the illustrated example, a node that performs the operation O2 is change to instead perform the operation O3. A crossover child 414 may be generated by combining aspects of two different parent algorithms 410, 412. Here, a node (and any nodes below it in the tree structure) of a first parent algorithm may be replaced with a node (and any nodes below it in the tree structure) of a second parent algorithm. Thus, in the illustrated example, the leaf node S2 in a first parent algorithm 410 may be replaced with the structure including leaf nodes S1, S2 and operator node O2 from a second parent algorithm 412 to generate the crossover child 414.

In one embodiment, only a subset of algorithms in a population may be selected to be parents for forming the next generation of algorithms. The algorithms that are selected as parents for the next generation may be randomly selected according to a probability distribution that favors higher scoring algorithms. The type and number of children generated from each parent may also be randomly selected according to a probability distribution within some constraining parameters. This makes it more likely that higher performing algorithms will pass on traits to the next generation of algorithms, thus causing the population of algorithms to generally improve as the number of iterations increases. Furthermore, in one embodiment, the highest performing algorithms may be automatically selected to produce elite children, thus ensuring that the highest performing algorithms are kept in the population.

Referring back to FIG. 2, after the next generation of combining algorithms is generated, it may then be determined 208 if the new population of children algorithms meets a stopping criterion. The stopping criterion may be, for example, that a predefined number of generations have been produced or that a combining algorithm in the current population meets a predefined performance criterion. If the stopping criterion is not met, the algorithm may repeat to step 204 and the process iterates beginning with the new generation of combining algorithms. If the stopping criterion is met, the highest scoring algorithm (e.g., best performing) may be selected 210 as the optimized combining algorithm that may be used by the online processing system 120 algorithm to combine multiple different solutions to an image or video processing task.

Figure 5:
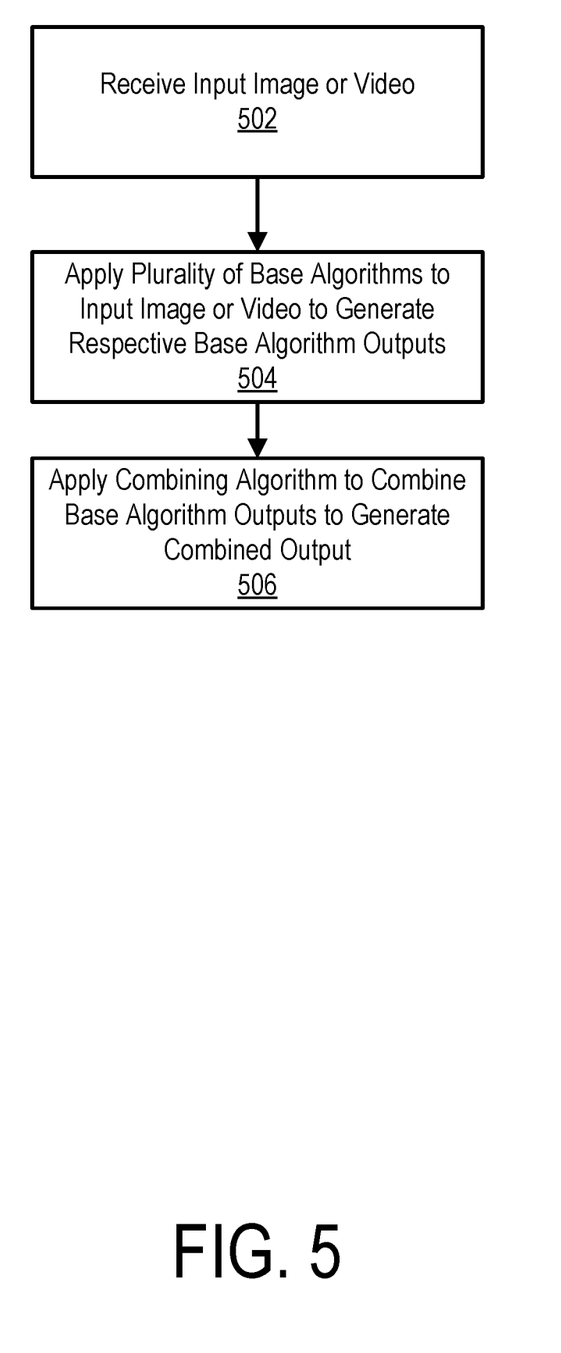
FIG. 5 illustrates an embodiment of a process for combining a plurality of independent solutions to an image or video processing task.

FIG. 5 is a flowchart illustrating an embodiment of a process for performing an image or video processing task by combining outputs from multiple independent base algorithms. An input image or video may be received 502. A plurality of different base algorithms may be applied to the input image or video to generate a plurality of base algorithm outputs providing respective results of the image or video processing task. A combining algorithm may be applied 506 (e.g., as generated by the offline combining algorithm generation system 110 for the particular image or video processing task) to combine the base algorithm outputs to generate a combined output.

Figure 6:
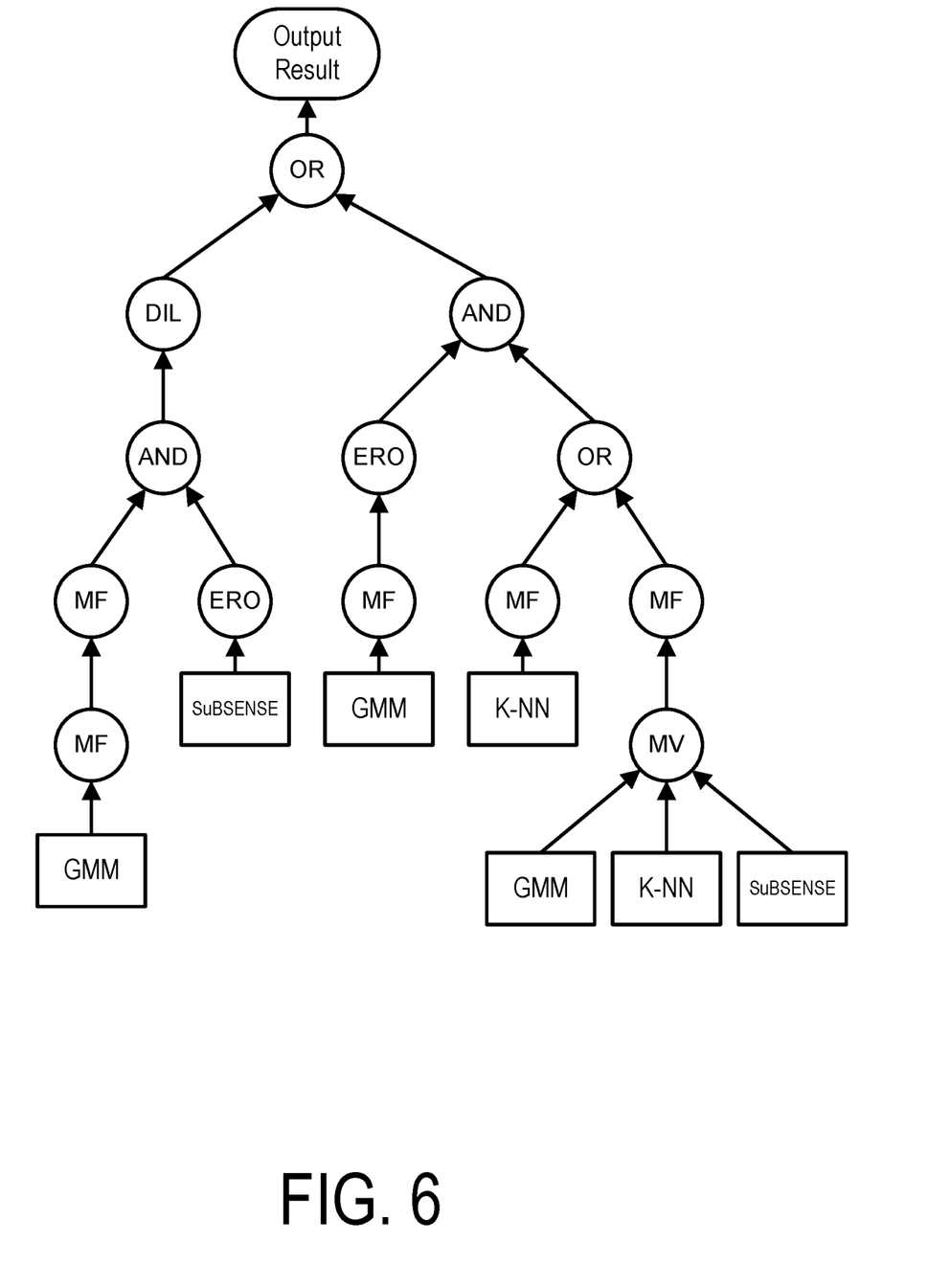
FIG. 6 illustrates a tree structure representing an example combining algorithm for combining results of independent base algorithms for solving a background segmentation task.

FIG. 6 illustrates an embodiment of a specific combining algorithm 600 for combining independent solutions to a background segmentation image or video processing task. Here, the inputs to the combining algorithm 600 may comprise outputs (e.g., in the form of binary masks) from a Gaussian Mixture Model algorithm ("GMM"), a K-Nearest Neighbors algorithm ("K-NN"), and a Self-Balanced Sensitivity Segmenter algorithm ("SuBSENSE") generated based on an input image. Furthermore, the operators are as follows: (1) a 5×5 median filter ("MF"); (2) a morphological image dilation with a 5×5 square kernel ("DIL"); (3) a morphological image erosion with a 5×5 square kernel ("ERO"); (4) a logical AND operation between two images ("AND"), (5) a logical OR operation between two images ("OR"); and (6) a majority vote with two or more images ("MV"). The binary masks from the different base algorithms are combined according to the operations shown to generate a combined output result.

Figure 7:
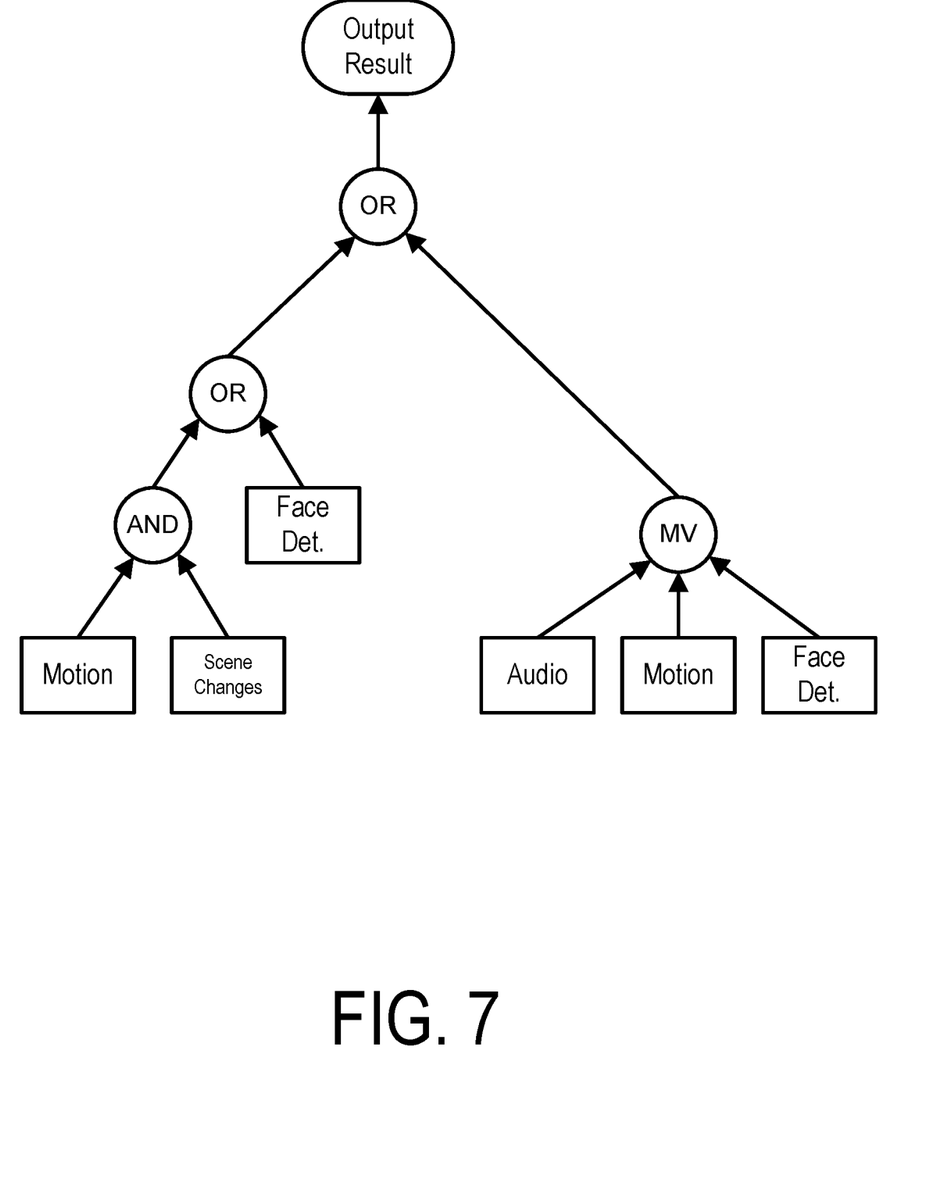
FIG. 7 illustrates a tree structure representing an example combining algorithm for combining results of independent base algorithms for solving an automatic highlight detection task.

FIG. 7 illustrates an embodiment of a specific combining algorithm 700 for combining independent solutions to an automatic highlight detection video processing task. Here, the inputs to the combining algorithm 700 may comprise outputs from a motion detection algorithm ("Motion"), a scene change detection algorithm ("Scene Changes"), a face detection algorithm ("Face Det."), and an audio highlight detection algorithm "Audio"). These inputs may each be in the form of a set of parameters indicating a time in the video at which the highlight occurred and a specified duration of how long the highlight occurs. The operators applied to these parameters may be as follows: (1) a majority vote for highlights occurring within the same time duration ("MV"); (2) a logical AND operation of the duration of the highlight ("AND"); and (3) a logical OR operation of the duration of the highlight ("OR"). The parameters detected by each of the base algorithms may be combined according to the operations shown to generate a combined output result.

In another embodiment, a combining algorithm (which may be automatically generated according to the processes described above) may combine outputs of solutions from different object tracking algorithms to generate a combined solution to the tracking problem. The combined solution may be beneficial since some tracking algorithms track color better while others track edges or other image parameters better.

In another embodiment, a combining algorithm (which may be automatically generated according to the processes described above) may combine outputs of solutions from different image registration or alignment algorithms to generate a combined solution to the image registration or alignment problem. For example, in one embodiment, an image may be tiled or sectioned into various blocks and different image registration or alignment algorithms may be applied to each tile or section. The sections can then be combined using the combining algorithm to achieve a combined result.

In another embodiment, a combining algorithm (which may be automatically generated according to the processes described above) may combine outputs of solutions from different image classification algorithms to generate a combined solution to the image classification problem. For example, each of the image classification algorithms may generate a scene similarity measure in a different way, and these scene similarity measures can be combined according to the combining algorithm to achieve a combined result.

In another embodiment, a combining algorithm (which may be automatically generated according to the processes described above) may combine outputs of solutions from different image stitching algorithms to generate a combined solution to the stitching problem. For example, different stitching algorithms may be based on blending of edges, three-dimensional warps, aligning features, or other independent techniques. The solutions can be combined according to the combining algorithm to achieve a combined result.

Computing Machine Architecture

FIG. 8 is a block diagram illustrating components of an example machine able to read instructions from a machine-readable medium and execute them in a processor (or controller) which may be used to carry out any of the processes described herein. Specifically, FIG. 8 shows a diagrammatic representation of a machine in the example form of a computer system 800 within which instructions 824 (e.g., software) for causing the machine to perform any one or more of the methodologies discussed herein may be executed. In alternative embodiments, the machine may operate as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 824 (sequential or otherwise) that specify actions to be taken by that machine. Further, while only a single machine is illustrated, the term "machine" may also be taken to include any collection of machines that individually or jointly execute instructions 824 to perform any one or more of the methodologies discussed herein.

Looking closer at the example computer system 800, it may include one or more processors 802 (generally processor 802) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 may include a machine-readable medium 822 on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 (e.g., software) may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., instructions 824) for execution by the machine and that cause the machine to perform any one or more of the methodologies disclosed herein. The term "machine-readable medium" may include, but not be limited to, data repositories in the form of solid-state memories, optical media, and magnetic media.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

The invention claimed is:

1. A method for combining solutions for an image or video processing task, the image or video processing task comprising an automatic highlight detection task, the method comprising:
    independently applying a first algorithm and a second algorithm to at least a first portion of a set of input images or video, each of the first and second algorithms comprising an automatic highlight detection algorithm that is different than that of the other;
    independently generating respective first and second algorithm results associated with the image or video processing task, the respective first and second algorithm results each comprising data indicative of (i) a temporal reference relating to the occurrence of a highlight within the at least first portion of the set of input images or video, and (ii) a duration of at least one aspect of the highlight;
    combining the first algorithm result with the second algorithm result, subsequent to applying one or more of a plurality of modification operations to at least one of the first algorithm result and the second algorithm result, into a first combined solution, the applying of the one or more modification operations comprising applying at least one of: (i) a majority vote for highlights occurring within a given duration, (ii) a logical AND operation for the duration of the at least one aspect of the highlight, or (iii) a logical OR operation for the duration of the at least one aspect of the highlight;
    evaluating a plurality of combined solutions, the plurality of combined solutions comprising the first combined solution and at least a second combined solution, the second combined solution being based on independently applying a plurality of algorithms to at least a second portion of the set of input images or video, the evaluating comprising determining a best combined solution for the image or video processing task, the best combined solution meeting at least one predefined optimization criterion with respect to the set of input images or video; and
    performing at least the automatic highlight detection task for the set of input images or video based at least on the determined best combined solution.

2. The method of claim 1, wherein the independently applying of the first plurality of algorithms comprises independently applying two or more of: (1) a motion-based algorithm, (2) a scene change detection algorithm, or (3) a face detection algorithm.

3. The method of claim 2, wherein the applying of the one or more of the plurality of modification operations comprises applying at least one of: (1) a median filter (MF) operation, (2) an erosion (ERO) operation, or (3) a dilation (DIL) operation.

4. The method of claim 1, further comprising:
applying one or more of the plurality of modification operations to the first combined solution thereby generating a modified result;
applying the first algorithm to the set of input images or video thereby generating a third algorithm result;
applying one or more of the plurality of modification operations to the third algorithm result thereby generating a first modified result; and
combining the modified result with the first modified result thereby generating a second combined result.

5. The method of claim 4, further comprising:
applying the second algorithm to the set of input images or video thereby generating a fourth algorithm result;
applying one or more of the plurality of modification operations to the fourth algorithm result thereby generating a second modified result; and
combining the second combined result with the second modified result thereby generating a third combined result.

6. The method of claim 5, further comprising applying one or more of the plurality of modification operations to the first combined solution, thereby generating a third modified result.

7. The method of claim 6, further comprising combining the third modified result with the third combined result, the combining of the third modified result with the third combined result resulting in the best combined solution for the respective combined solution the best combined solution meeting the predefined optimization criterion.

8. A non-transitory computer-readable storage apparatus comprising a storage medium having instructions stored thereon, the instructions for combining independent solutions for an image or video processing task, the image or video processing task comprising an automatic highlight detection task, the instructions being configured to, when executed by a processor apparatus, cause a computerized apparatus to:
apply a plurality of automatic highlight detection algorithms to a set of input images or video, each of the plurality of automatic highlight detection algorithms independently generating respective algorithm results to the automatic highlight detection task, each of the respective algorithm results comprising parameters indicating (i) at least one reference to a location in the set of input images or video at which a highlight occurred, and (ii) a duration for at least a portion of the highlight, the respective algorithm results comprising a first algorithm result and a second algorithm result;
combine at least two of the respective algorithm results, subsequent to application of one or more of a plurality of modification operations to at least one of the first algorithm result and the second algorithm result, into a first combined solution;
evaluate at least two combined solutions, the at least two combined solutions comprising the first combined solution, the evaluation to determine a best combined solution, the best combined solution meeting a predefined optimization criterion; and
use the best combined solution to perform at least the automatic highlight detection task for the set of input images or video;
wherein the application of the one or more of the plurality of modification operations comprises application of at least one of (i) a majority vote for highlights occurring within a prescribed duration, (ii) an AND operation, or (iii) an OR operation.

9. The non-transitory computer-readable storage apparatus of claim 8, wherein the application of the plurality of automatic highlight detection algorithms comprises an independent application of two or more of: (1) a motion algorithm, (2) a scene change detection algorithm, or (3) a face detection algorithm.

10. The non-transitory computer-readable storage apparatus of claim 9, wherein:
the application of the one or more modification operations comprises application of at least one of: (1) a median filter (MF) operation, (2) an erosion (ERO) operation, or (3) a dilation (DIL) operation.

11. The non-transitory computer-readable storage apparatus of claim 8, wherein the instructions are further configured to, when executed by the processor apparatus, cause the computerized apparatus to:
independently apply the plurality of algorithms to the set of input images or video, each of the plurality of algorithms independently generating first respective algorithm results to the automatic highlight detection task; and
combine the first respective algorithm results into a combined solution to the automatic highlight detection task.

12. The non-transitory computer-readable storage apparatus of claim 11, wherein the at least two algorithm results comprise first algorithm results and second algorithm results, and wherein the instructions are further configured to, when executed by the processor apparatus, cause the computerized apparatus to:
apply one or more of the one or more modification operations to the combined solution thereby resulting in generation of a modified result;
apply a first algorithm of the plurality of algorithms to the set of input images or video thereby resulting in generation of a third algorithm result;
apply the one or more of the one or more modification operations to the third algorithm result thereby resulting in generation of a first modified result; and
combine the modified result with the first modified result thereby resulting in generation of a second combined result.

13. The non-transitory computer-readable storage apparatus of claim 12, wherein the instructions are further configured to, when executed by the processor apparatus, cause the computerized apparatus to:
apply a second algorithm of the plurality of algorithms to the set of input images or video thereby resulting in generation of a fourth algorithm result, the second algorithm differing from the first algorithm;
apply one or more of the one or more modification operations to the fourth algorithm result thereby resulting in generation of a second modified result; and
combine the second combined result with the second modified result thereby resulting in generation of a third combined result.

14. The non-transitory computer-readable storage apparatus of claim 13, wherein the instructions are further configured to, when executed by the processor apparatus, cause the computerized apparatus to:
apply one or more of the one or more modification operations to the first combined solution, thereby resulting in generation of a third modified result.

15. The non-transitory computer-readable storage apparatus of claim 14, wherein the instructions are further configured to, when executed by the processor apparatus, cause the computerized apparatus to:

combine the third modified result with the third combined result, the combination of the third modified result with the third combined result resultant in the best combined solution for the respective combined solution, the best combined solution meeting the predefined optimization criterion.

16. A computer system, comprising:

a network interface configured to at least receive data comprising imaging content;

a processor apparatus; and a non-transitory computer-readable storage apparatus comprising a storage medium having instructions stored thereon, the instructions configured for combining independent solutions for an image or video processing task comprising an automatic highlight detection task, the instructions further configured to, when executed by the processor apparatus, cause the computer system to:

apply a plurality of algorithms to the imaging content, the plurality of algorithms comprising a plurality of automatic highlight detection algorithms, each of the plurality of algorithms independently generating respective algorithm results to the automatic highlight detection task, the respective algorithm results comprising a first algorithm result and a second algorithm result, at least a portion of the respective algorithm results comprising data representative of (i) a location relating to an occurrence of a highlight within the imaging content, and (ii) a duration of at least a portion of the highlight;

combine the first algorithm result with the second algorithm result, subsequent to application of one or more of a plurality of modification operations to at least one of the first algorithm result and the second algorithm result, into a first combined solution;

evaluate respective combined solutions, the respective combined solutions comprising the first combined solution, in order to determine a best combined solution for the respective combined solutions, the best combined solution meeting a predefined optimization criterion; and use the best combined solution to perform at least the automatic highlight detection task for the imaging content;

wherein the plurality of modification operations comprise (i) a majority vote for highlights with respect to at least a portion of the duration, (ii) an AND function with respect to the at least portion of the duration, and (iii) an OR function with respect to the at least portion of the duration.

17. The computer system of claim 16, wherein:

the application of the plurality of algorithms comprises an independent application of two or more of: (1) a motion algorithm, (2) a scene change algorithm, or (3) a face detection algorithm.

* * * * *